United States Patent [19]

Hirabayashi

[11] Patent Number: 4,754,827
[45] Date of Patent: Jul. 5, 1988

[54] BATTERY MOUNTING STRUCTURE FOR AN AUTOMOTIVE VEHICLE

[75] Inventor: Hirokazu Hirabayashi, Tokyo, Japan

[73] Assignee: Nissan Motor Company, Limited, Yokohama, Japan

[21] Appl. No.: 21,557

[22] Filed: Mar. 2, 1987

Related U.S. Application Data

[63] Continuation of Ser. No. 715,027, Mar. 22, 1985, abandoned.

[30] Foreign Application Priority Data

Mar. 28, 1984 [JP] Japan ............................ 59-44882[U]

[51] Int. Cl.$^4$ .............................................. B60R 18/02
[52] U.S. Cl. .................................... 180/68.5; 248/638; 267/292
[58] Field of Search ....................... 180/68.5; 267/63 R, 267/64.12, 153; 248/638

[56] References Cited

U.S. PATENT DOCUMENTS

| | | | |
|---|---|---|---|
| 3,216,679 | 11/1965 | Curwen | 248/638 X |
| 3,510,137 | 5/1970 | Freier | 248/638 X |
| 4,270,625 | 6/1981 | Nishimura et al. | 248/638 X |
| 4,520,887 | 6/1985 | DiFazio | 180/68.5 |
| 4,538,697 | 9/1985 | Muroi et al. | 180/300 X |

FOREIGN PATENT DOCUMENTS

| | | | |
|---|---|---|---|
| 735071 | 4/1943 | Fed. Rep. of Germany | 180/68.5 |
| 556687 | 7/1923 | France | 180/68.5 |
| 57-84223 | 5/1982 | Japan . | |
| 58-104566 | 7/1983 | Japan . | |

*Primary Examiner*—John J. Love
*Assistant Examiner*—Michael Mar
*Attorney, Agent, or Firm*—Foley & Lardner, Schwartz, Jeffery, Schwaab, Mack, Blumenthal & Evans

[57] ABSTRACT

A battery mounting structure for an automotive vehicle, wherein a battery is held in an elastic relationship with respect to the vehicle body so as to be free to vibrate relative to the vehicle body while being prevented from accidentally coming loose. Thus, the relatively large inertial mass of the battery serves to suppress vibration of the vehicle body, while other parts disposed in the engine compartment near the battery are protected from damage due to unrestrained movement of the battery.

11 Claims, 3 Drawing Sheets

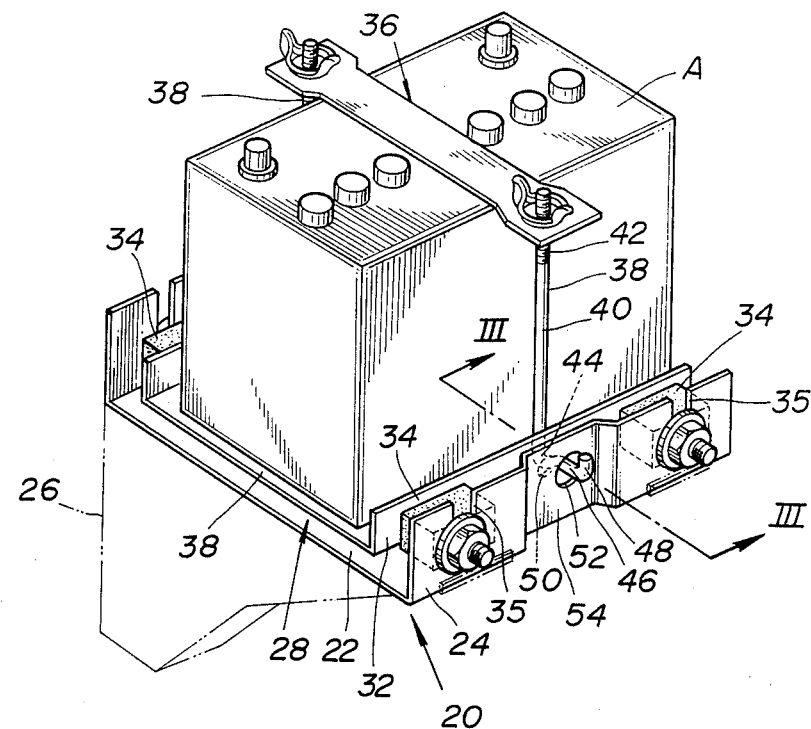
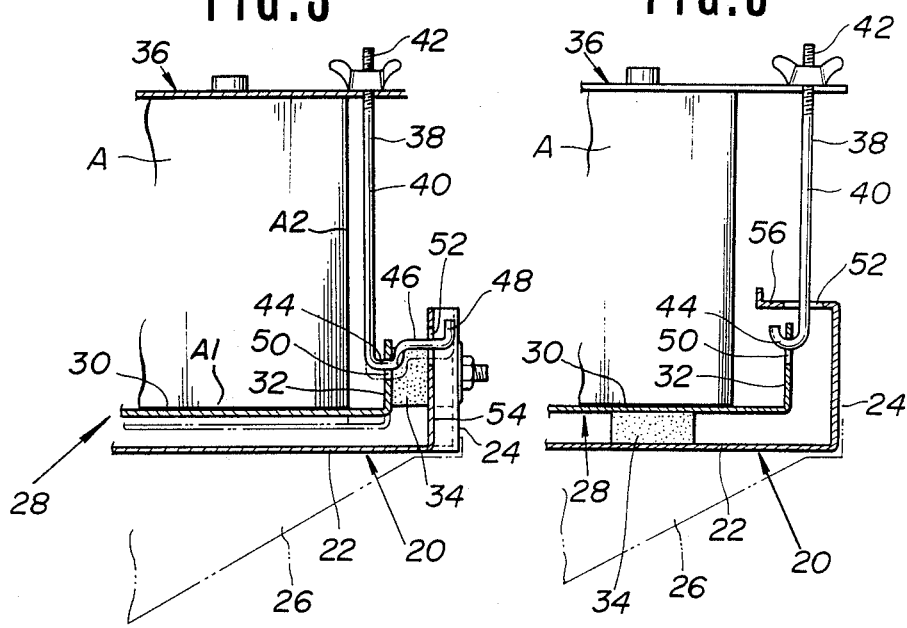

BATTERY MOUNTING STRUCTURE FOR AN AUTOMOTIVE VEHICLE

This application is a continuation of application Ser. No. 715,027, filed Mar. 22, 1985, now abandoned.

BACKGROUND OF THE INVENTION

1. Field of the Invention

The present invention relates generally to a battery mounting structure for an automotive vehicle and, more specifically, to an improvement thereof in which the battery is held elastically with respect to the vehicle body in order to be free to vibrate relative to the vehicle body so as to damp vibrations of the vehicle body, while the battery is prevented from accidentally coming loose.

2. Description of the Prior Art

As is well known, the vehicle body is subject to the dynamic vibration energy which is due mainly to engine vibrations and irregularities in the road surface while the vehicle is running. This vibration energy often causes sympathetic vibration of the vehicle body. In order to reduce this vibration of the vehicle body, it has been proposed to use a battery which has a relatively large effective inertia. For example, Japanese Patent First Publication No. 57-84223 and Japanese Utility Model First Publication No. 58-104566 disclose a battery mounting structure wherein the battery is allowed to vibrate relative to the vehicle body by means of elastic couplers so that the battery serves to damp vibration of the vehicle body. In FIG. 1, a fixed plate 1 has floor 2 and two upright walls 3 and is fixed to a bracket 4 which is fixedly mounted within the engine compartment. A movable plate 5 also has a floor 6 and two upright walls 7. The floors 2 and 6 lie parallel at a given distance from each other. Four elastic members 8 are provided between the upright walls 3 and 7. Each elastic member 8 is fixed to the fixed plate 1 by means of a nut-and-bolt and is bonded to the movable plate 5. The battery A is fixedly mounted on the movable plate 5 by means of a clamp 9 having two clamp rods 10. Each clamp rod 10 engages an opening 11 formed in each upright wall 7 with its hook-shaped lower end and is bolted at its upper end.

With this structure, the battery A and the movable plate 5 are free to vibrate relative to the fixed plate 1 through the elastic members 8 so that the relatively large inertial mass of the battery serves to suppress vibration of the vehicle body B.

In the structure mentioned above, however, as the elastic members wear down and fail, there is an increasing possibility that the battery and the movable plate will come loose and fall off the fixed plate 1, possibly damaging other members in the engine compartment.

SUMMARY OF THE INVENTION

In view of the above problem, it is the primary object of the present invention to provide a battery mounting structure for an automotive vehicle wherein a battery is held elastically with respect to the vehicle body in order to allow the battery to vibrate relative to the vehicle body, while preventing the battery from accidentally coming loose.

According to the present invention, there is provided a battery mounting structure for an automotive vehicle comprising first means fixed to the vehicle body for receiving the battery, second means holding the battery in an elastic relationship with respect to the first means so as to allow the battery to vibrate relative to the first means, third means for constraining the battery to within a given range with respect to the first means.

BRIEF DESCRIPTION OF THE DRAWINGS

The present invention will be more fully understood from the detailed description given below, and from the accompanying drawings of the preferred embodiments of the present invention, which, however, are not to be taken as limiting the present invention in any way, but are for the purpose of elucidation and explanation only.

In the drawings:

FIG. 2 is a perspective view of a battery mounting structure for an automotive vehicle according to the first embodiment of the present invention;

FIG. 3 is a cross-sectional view taken along line III—III in FIG. 2;

FIG. 6 is a cross-sectional view, similar to FIG. 3, of a battery mounting structure for an automotive vehicle according to the fourth embodiment of the present invention.

DETAILED DESCRIPTION OF THE PREFERRED EMBODIMENTS

Figure 1:
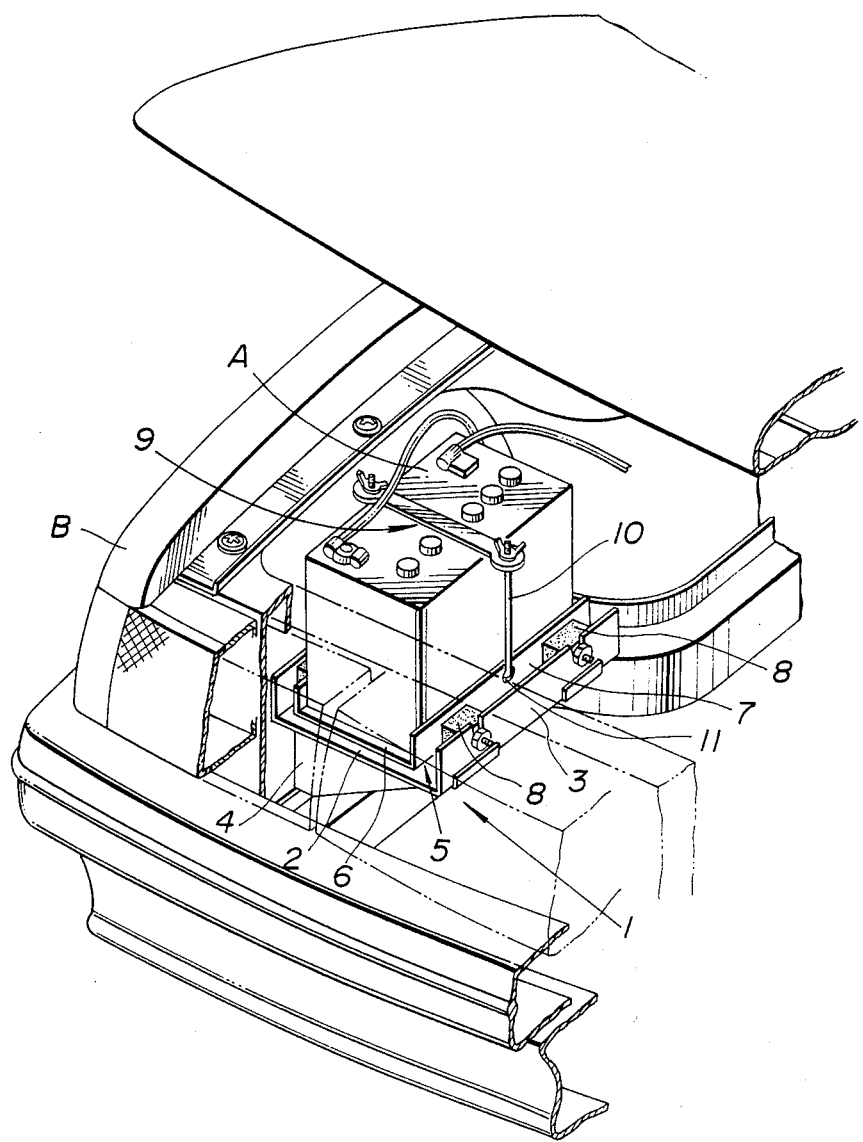
FIG. 1 is a perspective view of a battery mounting structure for an automotive vehicle of the prior art.

Referring now to the drawings, four preferred embodiments will be described hereinbelow. The same, like or corresponding parts or members are designated by the same reference through FIGS. 2 to 6 in order to avoid redundant descriptions.

FIGS. 2 and 3 show the first embodiment of the present invention. In FIG. 2, a fixed plate 20 has a floor 22 and two upright walls 24 and is fixed to a bracket 26 which is fixedly mounted in the engine compartment. A movable plate 28 also has a floor 30 and two upright walls 32. The floors 22 and 30 lie parallel at a given distance from each other as clearly seen in FIG. 3. Four elastic members 34 are connected between the upright walls 24 and 32. One edge of each elastic member 34 is fixed to the fixed plate 20 by means of a nut-and-bolt passing through a cut-out 35 and another edge is bonded to the movable plate 28. The battery A is fixedly mounted on the movable plate 28 by means of a clamp 36 having two clamp rods 38. A first side A1 of the battery A rests on the movable plate 28. A second side A2 of the battery is substantially perpendicular to the first side A1. Each clamp rod 38 has a vertical section 40 with a threaded upper end 42, an outward hook 44, a horizontal section 46 and an upward hook 48 at its free end. Each clamp rod 38 is bolted at its threaded end 42 and hooks an opening 50 in a corresponding upright wall 32 by means of its outward hook 44. The horizontal section 46 passes perpendicularly through an opening 52 formed in an indented section 54 of the upright wall 24. The vertical plane of the opening 52 is substantially parallel to the second side A2 of the battery A. The opening 52 is sufficiently larger in area than the cross-section of the horizontal section 46 to leave some circumferential clearance. The vertical hook 48 of the clamp rod 38 is separated by a given distance from the upright wall 24 so that the horizontal portion 46 can move in the direction perpendicular to the plane of the opening 52 or perpendicular to the second side A2 of the battery, but not beyond the given distance.

This structure allows the battery A along with the movable plate 28 to vibrate relative to the fixed plate through the elastic members so that the relatively large inertial mass of the battery serves to suppress vibration of the vehicle body, while the accidental separation of the battery and the movable plate 28 from the fixed plate 20 is prevented even if the elastic members should fail.

Figure 4:
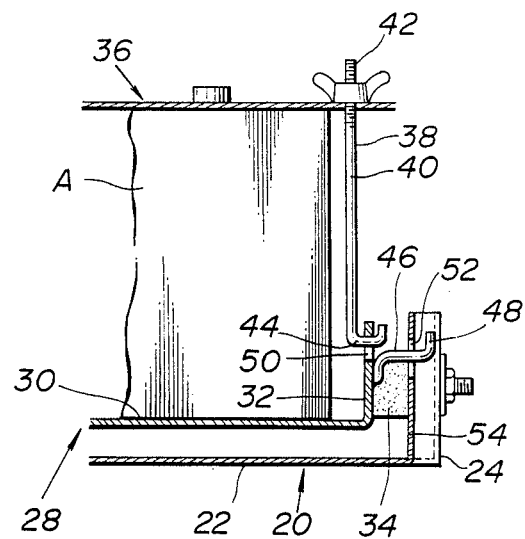
FIG. 4 is a cross-sectional view, similar to FIG. 3, of a battery mounting structure for an automotive vehicle according to the second embodiment of the present invention.

FIG. 4 shows the second embodiment of the present invention. In this embodiment, the horizontal section 46 and the vertical hook 48 are not part of the clamp rod 38 but are integrally formed with the upright wall 32 of the movable plate 28. The rest of the structure is essentially the same as in the first embodiment.

This structure provides the same effect as the first embodiment.

Figure 5:
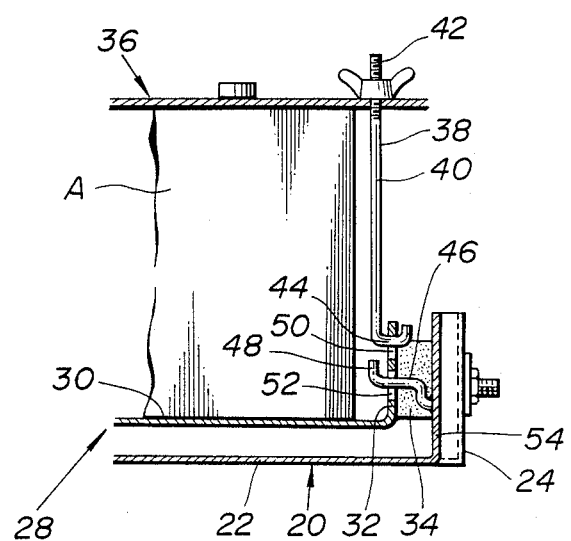
FIG. 5 is a cross-sectional view, similar to FIG. 3, of a battery mounting structure for an automotive vehicle according to the third embodiment of the present invention.

FIG. 5 shows the third embodiment of the present invention. In this embodiment, the horizontal section 46 and the vertical hook 48 are not part of the clamp rod 38 but are integrally formed with the upright wall 24 of the fixed plate 20 and the opening 52 is not formed in the upright wall 24 of the fixed plate 20 but is formed in the upright wall 32 of the movable plate 28. The vertical hook 48 is separated by a given distance from the upright wall 32 of the movable plate 28 to allow the horizontal section 46 to move in the direction perpendicular to the plane of the opening 52, but not beyond the given distance. The rest of the structure is essentially the same as in the first embodiment.

This structure also provides the same effect as the first embodiment.

FIG. 6 shows the fourth embodiment of the present invention. In this embodiment, the elastic members 34 do not connect the upright walls 24 and 32 but rather are disposed between and bonded to the floors 22 and 30. The fixed plate 20 has two horizontal flanges 56 extending inwards form the upright wall 24. The upright wall 24 is not formed with the indented section 54, the cut-outs 35 or the opening 52 used in the first embodiment. Rather, the openings 52 pass through the horizontal flanges 56, so as to allow the clamp rods 38 to reach the movable plate 28. The clamp rods 38 have inward hooks 44 which engage the openings 50 to secure the battery to the movable plate 28. The rest of the structure is essentially the same as in the other embodiments. As each opening 52 is sufficiently larger in area than the cross-section of the corresponding clamp rod 38, the clamp rods 38 are free to move in any direction in the horizontal plane within the opening 52. The upper end of the upright wall 32 of the movable plate 28 opposes the corresponding flange 56 at a given distance, so that the battery/movable plate assembly can move vertically within the given distance.

This structure also provides the same effect as the first embodiment.

It is to be understood that the invention is not to be limited to the embodiments described above, and that various changes and modifications may be made without departing from the spirit and scope of the invention as defined in the appended claims.

What is claimed is:

1. A battery mounting structure of an automotive vehicle comprising:
    a fixed plate having a first essentially horizontal floor and a pair of first essentially vertical walls extending upwardly from opposite ends of said first floor and being essentially parallel with each other, said fixed plate being attached to the vehicle body;
    a movable plate having a second essentially horizontal floor and a pair of second essentially vertical walls extending upwardly from opposite ends of said second floor and being essentially parallel with each other, said movable plate disposed within said fixed plate with said second walls being essentially parallel with said first walls;
    first means provided between said fixed plate and said movable plate for elastically supporting said movable plate with respect to said fixed plate;
    second means for fixing a battery onto said movable plate; and
    stabilizing means fixed to said movable plate and passing through first openings formed, respectively, in said first walls without contacting the edges of said first openings to allow said stabilizing means to move in any direction in a vertical plane of said first openings within a given range, movement of said stabilizing means beyond said given range being prevented by the edges of said openings; wherein said second means comprises a clamp having an essentially horizontal member and a pair of first essentially vertical rods having lower ends engaging, respectively, with second openings formed in said second walls to fix the battery onto the movable plate and said stabilizing rods formed integral, respectively, with said first rods and extending outwardly from the lower ends of said first rods, said horizontal rods passing through the first openings without contacting the edges of the first openings.

2. A battery mounting structure as set forth in claim 1, further comprising a second essentially vertical rod formed integral with each of said horizontal rods and extending from the outer end of each horizontal rod, said second vertical rods being spaced, respectively, a given distance from the corresponding first vertical walls to prevent said horizontal rods from moving in a direction perpendicular to said vertical plane of the first openings beyond the given distance.

3. A battery mounting structure as set forth in claim 2, wherein said first means comprises a plurality of elastic members each arranged between said first and second vertical walls and each fixed to said first wall by means of a nut-and-bolt and bonded to said second wall.

4. A battery mounting structure for an automotive vehicle comprising:
    a first relatively thin member fixed to the vehicle body;
    a second relatively thin member for holding said battery, said second member being received within said first member and being supported in an elastic relationship with respect to said first member so as to allow said second member to vibrate relative to said first member;
    means for fixedly mounting said battery onto said second member;
    means for preventing said second member from coming loose from said first member by constraining movement of said second member to within a given range with respect to said first member; and means disposed between said first and second members for elastically connecting said first and second members;

wherein said first relatively thin member includes a first essentially horizontal floor and two first essentially upright walls arranged essentially in parallel, said second relatively thin member includes a second essentially horizontal floor on which said battery rests and two second essentially upright walls arranged essentially in parallel, said first and second floors being spaced a given distance from each other;

wherein said second walls are disposed between said first walls and essentially parallel thereto, said battery mounting means including a clamping member having an essentially horizontal section engaging the battery and a pair of essentially vertical sections between which said battery is disposed, each of said vertical sections extending between an upper end engaging said horizontal section and a lower end engaging a first opening formed in each of said second walls and applying a biasing force on said battery toward said second relatively thin member, said connecting means including a plurality of elastic members disposed between said first and second walls and said preventing means including an essentially horizontal extension from each of said vertical sections of said clamping member and a second opening formed in each of said first walls through which a corresponding extension passes without contact with said first wall, said clamping member having an essentially vertical extension from each of said horizontal extensions, and said vertical extension being spaced a given distance from said first wall.

5. A battery mounting structure as set forth in claim 4, wherein each of said elastic members is fixed to said first wall by nut and bolt means and is bonded to said second wall.

6. A battery mounting structure for an automotive vehicle comprising:
a base fixed to the vehicle body;
a movable member receiving thereon a battery;
first means provided between said base and said movable member for supporting said movable member in an elastic relationship with respect to said base;
second means, including rod means having first and second ends, said rod means engaging near the second end with first openings formed, respectively, in said movable member at its opposite sides, for fixing said battery onto said movable member;
limiting means comprising a portion of said rod means and passing through second openings formed, respectively, in said base at its opposite sides without normally contacting the edges of said second openings for allowing said battery along with said movable member to move in any direction within a given range with respect to said base so as to ensure said elastic relationship between said base and said movable member, the movement of said battery along with said movable member in any direction of a plane of said second openings beyond said given range being prevented by engagement of said limiting means with the edges of said second openings.

7. A battery mounting structure as set forth in claim 6, wherein said base comprises a first plate having first essentially vertical walls extending upwardly from opposite sides of said first plate and said movable member comprises a second plate having second essentially vertical walls extending upwardly from opposite sides of said second plate, said second plate being received within said first plate with said second walls facing said first walls, said first openings formed, respectively, in said second walls and said second openings formed, respectively, in said first walls, said rod means including a pair of essentially vertical rods each engaging with said first opening for fixing said battery onto said second plate, said limiting means including a pair of essentially horizontal rods each extending outwardly from a lower end of each vertical rod, said horizontal rods each passing through said second opening without contacting the edge of said second opening.

8. A battery mounting structure as set forth in claim 7, wherein said limiting means further includes an essentially vertical portion extending from an outer end of each horizontal rod, said vertical portions being spaced, respectively, a given distance from the corresponding first vertical walls to prevent said battery along with said movable member from moving in a direction perpendicular to a vertical plane of the second openings beyond the given distance by engagement of said vertical portions and said base adjacent said second openings.

9. A battery mounting structure for an automotive vehicle comprising:
a base fixed to the vehicle body;
a movable member receiving thereon a battery;
first means provided between said base and said movable member for supporting said movable member in an elastic relationship with respect to said base;
second means comprising a generally L-shaped rigid member having a leg portion and a base portion, said base portion engaging with first openings in said movable member at opposite sides of said movable member, and said leg portion being connected with said battery for fixing said battery onto said movable member;
one of said portions of said L-shaped member extending through second openings formed, respectively, in said base at its opposite sides without normally contacting the edges of said second openings to allow said battery along with said movable member to move in any direction within a given range with respect to said base so as to ensure said elastic relationship between said base and said movable member, the movement of said battery along with said movable member in any direction of a plane of said second openings beyond said given range being prevented by engagement between said second means and the edges of said second openings.

10. A battery mounting structure as set forth in claim 9, wherein said rigid members comprise a pair of generally L-shaped rods.

11. A battery mounting structure as set forth in claim 9, wherein said base comprises a first plate having first essentially vertical walls extending upwardly from opposite sides of said first plate and said movable member comprises a second plate having second essentially vertical walls extending upwardly from opposite sides of said second plate, said second plate being received within said first plate with said second walls facing said first walls, said first openings formed, respectively, in said first walls, said second means including a pair of essentially vertical rods each engaging with a second opening formed in each of said second walls for fixing said battery onto said movable plate and each further extending essentially horizontally through said first opening without contacting the edge of said first opening.

* * * * *